United States Patent [19]

Otani et al.

[11] Patent Number: 4,866,157
[45] Date of Patent: Sep. 12, 1989

[54] THERMOSETTING AROMATIC RESIN COMPOSITION

[76] Inventors: Sugio Otani, 2010-2, Hishimachi Kurokawa, Kiryu-shi, Gunma-ken; Michiya Ota, 1-103, Motosoja Jutaku, 152-263, Motosoja-machi, Maebashi-shi, Gunma-ken, both of; Akira Kojima, 338, Motomachi 4-chome, Kiryu-shi, Gunma-ken, all of Japan

[21] Appl. No.: 268,048

[22] Filed: Nov. 7, 1988

[30] Foreign Application Priority Data

Nov. 10, 1987 [JP] Japan ................... 62-282080

[51] Int. Cl.$^4$ ............................... C08G 10/00
[52] U.S. Cl. .............................. 528/230; 528/233; 528/396; 527/500
[58] Field of Search ............ 528/230, 233, 396; 527/500

[56] References Cited

U.S. PATENT DOCUMENTS

| | | | |
|---|---|---|---|
| 3,565,832 | 2/1971 | Bilow et al. | 528/396 |
| 4,346,212 | 8/1982 | Robinson et al. | 528/229 |
| 4,403,089 | 9/1983 | Buck | 528/47 |
| 4,758,653 | 7/1988 | Otani et al. | 528/396 |
| 4,788,341 | 11/1988 | Zoeller | 568/315 |

Primary Examiner—Morton Foelak
Assistant Examiner—S. A. Acquah
Attorney, Agent, or Firm—Lorusso & Loud

[57] ABSTRACT

A thermosetting resin composition is disclosed which comprises a fusible product obtained by a method including the steps of:

providing a mixture which comprises (a) a raw material containing one or more condensed polynuclear aromatic compounds having at least two condensed benzene rings, (b) a crosslinking agent containing an aromatic compound having one or more aldehyde groups directly bonded to the aromatic nuclei thereof, and (c) an acid catalyst; and reacting the mixture at a temperature sufficient to effect the crosslinking of the one or more condensed polynuclear aromatic compounds, thereby to obtain the fusible product. A further heat treatment of the thermosetting resin composition gives a COPNA resin which is an infusible, insoluble, condensed, polynuclear aromatic hydrocarbon resin.

6 Claims, 1 Drawing Sheet

THERMOSETTING AROMATIC RESIN COMPOSITION

This invention relates to a novel thermosetting resin composition and to a process for the production of a heat-resisting, condensed polynuclear aromatic hydrocarbon resin.

Extensive studies have been hitherto made for developing aromatic polymers having excellent thermal resistance and mechanical strength. Aromatic polyamide and polyimide resins, phenol resins and their modified resins are examples of known aromatic polymers.

In U.S. Pat. No. 4,758,653, there is disclosed a novel thermosetting resin composition affording an infusible, insoluble, condensed, polynuclear aromatic hydrocarbon resin (COPNA resin). The thermosetting resin composition includes a fusible product obtained by reacting a mixture containing (a) one or more condensed polynuclear aromatic compounds having at least three condensed benzene rings, (b) a crosslinking agent containing an aromatic compound having at least two hydroxymethyl or halomethyl groups, and (c) an acid catalyst, to crosslink the aromatic compounds. The thermosetting resin composition is suitably used as binders and as raw materials for the production of heat-resisting, molded articles.

The COPNA resin obtained from the known thermosetting resin composition has been found to begin decomposing when heated to a temperature of about 450° C. in an inert atmosphere. The thermal decomposition of the COPNA resin proceeds rapidly with the simultaneous reduction in weight. The weight loss generally exceeds 50% when heated to 800° C. For these reasons, when the known COPNA resin is used as a precursor for a shaped carbon article, molding failures such as cracks and blisters are likely to be caused.

The present invention has been made to overcome the above problems and has as its object the provision of a thermosetting resin composition which affords an improved COPNA resin having an excellent heat resisting property.

In accordance with the present invention there is provided a thermosetting resin composition comprising a fusible product obtained by a method including the steps of:

providing a mixture which comprises (a) a raw material containing one or more condensed polynuclear aromatic compounds having at least two condensed benzene rings, (b) a crosslinking agent containing an aromatic compound having one or more aldehyde groups directly bonded to the aromatic nuclei thereof, and (c) an acid catalyst; and reacting said mixture at a temperature sufficient to effect the crosslinking of said one or more condensed polynuclear aromatic compounds, thereby to obtain said fusible product.

In another aspect, the present invention provides a process for the production of a heat-resisting, condensed polynuclear aromatic hydrocarbon resin, comprising the steps of:

providing a mixture which comprises (a) a raw material containing one or more condensed polynuclear aromatic compounds having at least two condensed benzene rings, (b) a crosslinking agent containing an aromatic compound having one or more aldehyde groups directly bonded to the aromatic nuclei thereof, and (c) an acid catalyst;

reacting said mixture at a temperature sufficient to effect the crosslinking of said one or more condensed polynuclear aromatic compounds and to form the heat-resisting, condensed polynuclear aromatic hydrocarbon resin as an infusible product.

BRIEF DESCRIPTION OF DRAWINGS:

The present invention will now be described in detail below with reference to the accompanying drawing, in which.

Figure 1:
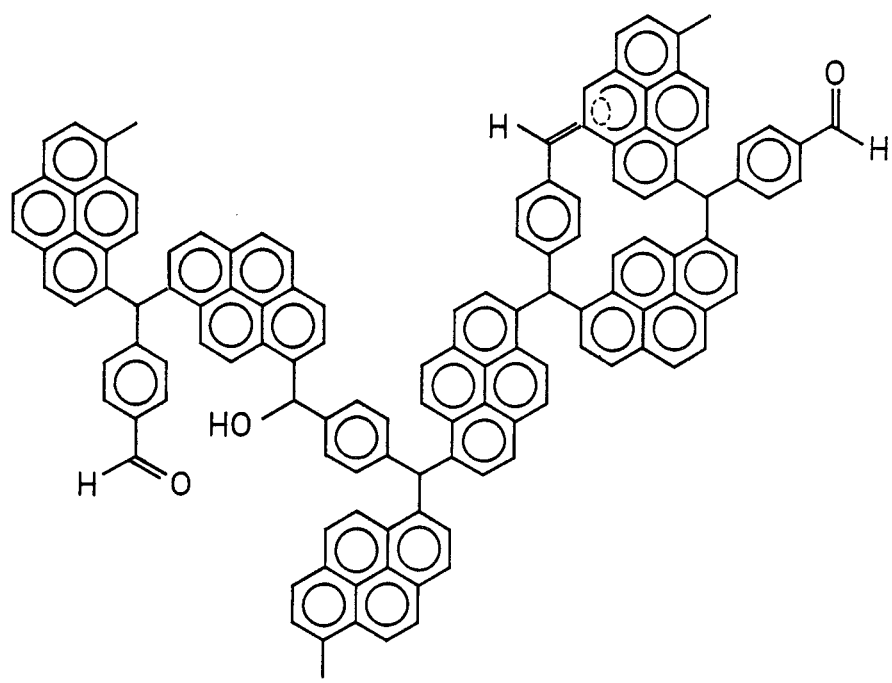
FIGS. 1 and 2 are schematic representations of the chemical structures of precursors (B-stage resins) of COPNA resins according to the present invention.

The thermosetting resin composition according to the present invention comprises a fusible product (B-stage resin) obtained by reacting a mixture containing (a) a raw material containing one or more condensed polynuclear aromatic compounds having at least two condensed benzene rings, (b) a crosslinking agent containing an aromatic compound having one or more aldehyde groups directly bonded to the aromatic nuclei thereof, and (c) an acid catalyst to crosslink the condensed polynuclear aromatic compound or compounds.

Examples of suitable condensed polynuclear aromatic compounds to be used as the raw material (a) include naphthalene, phenanthrene, anthracene, pyrene, chrysene, naphthacene, fluoranthene, perylene, picene, benzpyrenes, benzperylenes, and mixtures thereof. Derivatives of these aromatic compounds, such as those having one or more substituents bonded to their aromatic nuclei and selected from alkyl groups, a hydroxyl group, alkoxy groups and a carboxy group may also be suitably used. Coal tar, coal tar pitches and petroleum pitches are also preferred examples of the raw material.

Examples of the crosslinking agent (b) include benzaldehyde, terephthaladehyde and naphthylaldehyde. Derivatives of these aldehydes, such as those having one or more substituents bonded to their aromatic nuclei and selected from alkyl groups, a hydroxymethyl group, alkoxy groups and a carboxyl group may also be used.

Any acid catalyst conventionally used for catalyzing electrophilic substitution may be used for the crosslinking of the raw material. Illustrative of suitable acid catalysts (c) are p-toluenesulfonic acid, trichloroacetic acid, sulfuric acid and other proton acids.

The molar ratio of the crosslinking agent (b) to the raw material (a) is preferably 0.75:1 to 3.0:1. When the molar ratio is below 0.75:1, the amount of unreacted raw material (a) in the product is increased. When the molar ratio exceeds 3:1, the amount of unreacted crosslinking agent (b) is increased in the product.

The crosslinking reaction can be effected with or without using a solvent. When no solvent is used, the reaction proceed in a fused state. It is also possible to carry out the crosslinking reaction in a slurried form using an alcohol as a reaction medium.

The reaction for the formation of the B-stage resin is performed at a temperature of, generally 100°-350° C., preferably 140°-350° C., though the tempeature varies with the kinds and amounts of the raw material, crosslinking agent and acid catalyst. The reactivity of the raw material decreases in the order of: naphthol>pyrene, anthracene>pitches>>phenanthrene, methylnaphthalene and naphthalene. The last three compounds have quite low reactivity and require a reaction temperature of 200°-350° C. for forming a B-stage resin when p-toluenesulfonic acid is used in an amount of 5 wt %. When trichloroacetic acid or sulfuric acid is substituted for the p-toluenesulfonic acid, however, a reaction temperature of 160° C. can give the B-stage resin.

It is important that the mixture containing the components (a), (b) and (c) described above should be reacted at a temperature and for a period of time insufficient to produce a hardened resin, in order to obtain an incompletely hardened, fusible resin, i.e. B-stage resin. The B-stage resin is generally insoluble in methanol and n-hexane, hardly soluble in benzene and soluble in pyridine, quinoline and tetrahydrofuran. The B-stage resin obtained at an early stage of the reaction is in the form of a paste at room temperature. As the reaction proceeds further, the softening point of the B-stage resin becomes high. When the B-stage resin is used as a binder or an adhesive for the fabrication of various composite materials, it is preferred that the reaction be continued so that the resulting B-stge resin becomes fluid at a temperature of 70°-120° C. When used by itself for the production of shaped products, the reaction is suitably allowed to proceed so that the resulting resin has a viscosity suitable for pouring into a mold cavity at a temperature of 80°-150° C. If the molding or shaping is carried out using powder of the B-stage resin, the reaction is desirably performed so as to obtain the B-stage resin with a high melting point.

Figure 2:
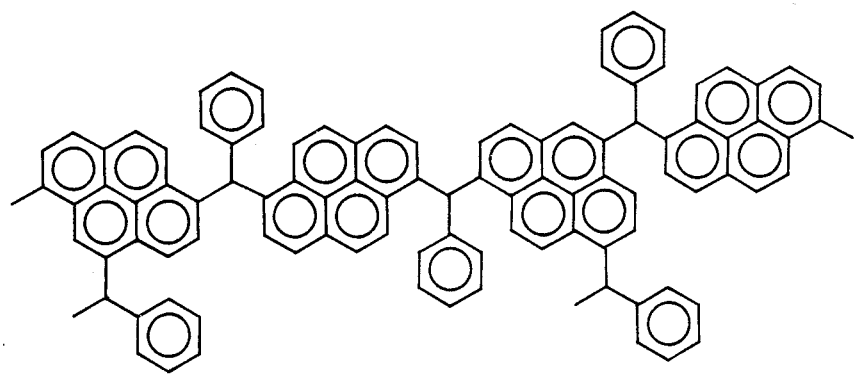

It is believed that the B-stage resin has a chemical structure represented by a model structure shown in FIGS. 1 and 2. The B-stage resin of FIG. 1 is obtained using pyrene as the condensed polynuclear aromatic compound (a) and terephthaldehyde as the crosslinking agent (b), while the B-stage resin of FIG. 2 is obtained using pyrene as the aromatic compound (a) and benzaldehyde as the crosslinking agent. In both B-stage resins, the pyrene molecules are crosslinked by methyne linkages derived from the aldehyde compounds. The model structures are in well conformity with those deduced from the results of infra-red spectra and elementary analyses.

The B-stage resin can be formed into films, powder or fibers and can be used together with an inorganic fibers such as carbon fibers and glass fibers for the formation of a composite material. The B-stage resin gives, when heated to 130° C. or more, a COPNA resin which is infusible and insoluble in a solvent and which has an excellent heat resistance. The formation of COPNA resin is considered to result from the formation of new condensed rings accompanied with dehydrogenation. The conversion of the B-stage resin into the COPNA resin can be also effected by contacting the B-stage resin with a concentrated acid such as concentrated sulfuric acid. This method is effective in hardening a thin film of the B-stage resin. The COPNA resin may be of course prepared directly from the previously described mixture. The COPNA resin with excellent properties can be obtained when it is post-treated by heating it at a temperature of 250°-350° C.

The following examples will further illustrate the present invention.

EXAMPLE 1

A thermosetting composition containing pyrene, benzaldehyde and p-toluenesulfonic acid and having a molar ratio of benzaldehyde to pyrene of 1.25 and a p-toluenesulfonic acid concentration of 5% by weight was thoroughly pulverized and mixed, and the mixture (10 g) was placed into a test tube. The contents in the test tube were then heated to 160° C. and maintained at that temperature for 6 hours to obtain a black product (B-stage resin) having a softening point of about 120° C. The heating of the B-stage resin at 160° C. for 3 hours gave an infusible product (COPNA resin) which was insoluble in organic solvents. The infusible product was further heated at 300° C. for 30 minutes (post-treatment) and then subjected to a thermograviometric analysis (heating rate 10° C./minute) to reveal that the COPNA resin began decomposing at a temperature of 503° C. The decomposition proceeded slowly as the temperature is raised. At 800° C., the reduction in weight was about 50%.

EXAMPLE 2

A thermosetting composition (10 g) containing pyrene, terephthaldehyde and p-toluenesulfonic acid and having a molar ratio of the aldehyde to pyrene of 1.25 and a p-toluene-sulfonic acid concentration of 5% by weight was thoroughly mixed and the mixture was placed in a test tube. The contents in the test tube were then heated with stirring under a nitrogen stream at 160° C. After 90 minutes from the commencement of the heating, the mixture became impossible to stir. Thus, the heating was stopped and the reaction mixture was allowed to be cooled to room temperature. A black glassy product (B-stage resin) having a softening point of 130° C. was obtained. This resin was converted into a hardened, infusible, insoluble product (COPNA resin) upon heated at 150° C. for 24 hours. The infusible product was further heated at 300° C. for 30 minutes (post-treatment) and then subjected to a thermograviometric analysis (heating rate 10° C./minute) to reveal that the COPNA resin began decomposing at a temperature of 525° C. The decomposition proceeded slowly as the temperature is raised. At 800° C., the reduction in weight was about 55%.

EXAMPLE 3

Thermosetting compositions containing the aromatic compounds shown in Table 1 below, terephthaldehyde and p-toluenesulfonic acid and each having a molar ratio of the aldehyde to the aromatic compound of 1.25 and a p-toluenesulfonic acid concentration of 5% by weight were each thoroughly mixed and each mixture was placed in a test tube. The contents in each test tube were then heated with stirring under a nitrogen stream at 160° C. As the reaction proceeded, the mixture was turned cream color in the case of beta-naphthol and black in the other cases. The heating was stopped when it became impossible to continue the stirring. The time period from the commencement till the stop of the heating was herein defined as a time period required for forming B-stage resin, and the results were as shown in Table 1. The reactivities of the aromatic compounds were found to decrease in the order of beta-naphthol, pyrene, anthracene, phenanthrene, methylnaphthalene and naphthalene. The last three compounds failed to give B-stage resins in the above reaction conditions. The B-stage resins obtained with the use of beta-naphthol, pyrene and anthracene had softening points of 100°-130° C. and gave infusible, insoluble resins (COPNA resins) upon further heat treatments. Using phenanthrene, methylnaphthalene and naphthalene, the above procedures were repeated in the same manner as described, except that p-toluenesulfonic acid (PTS) was replaced by concentrated sulfuric acid. As a result, B-stage resins were obtained after about 6 hours heat treatment. These resins also were found to give COPNA resins upon further heat treatment.

TABLE 1

| Aromatic Compound | Catalyst | Time Required for Forming B-Stage Resin (minutes) |
| --- | --- | --- |
| β-Naphthol | PTS | 20 |
| Pyrene | PTS | 90 |
| Anthracene | PTS | 360 |
| Phenanthrene | $H_2SO_4$ | 360 |
| Methylnaphthalene | $H_2SO_4$ | 360 |
| Naphthalene | $H_2SO_4$ | 360 |

What is claimed is:

1. A thermosetting resin composition comprising a fusible product obtained by a method including the steps of:
    providing a mixture which comprises (a) a raw material containing one or more condensed polynuclear aromatic compounds having at least two condensed benzene rings, (b) a crosslinking agent containing an aromatic compound having one or more aldehyde groups directly bonded to the aromatic nuclei thereof, and (c) an acid catalyst; and
    reacting said mixture at a temperature sufficient to effect the crosslinking of said one or more condensed polynuclear aromatic compounds, thereby to obtain said fusible product.

2. A composition as set forth in claim 1, wherein said raw material is selected from the group consisting of naphthalene, phenanthrene, anthracene, pyrene, chrysene, naphthacene, fluoranthene, perylene, picene, benzpyrenes, benzperylenes, derivatives and mixtures thereof, and pitches.

3. A composition as set forth in claim 1, wherein said crosslinking agent is benzaldehyde, terephthaladehyde, naphthylaldehyde and derivatives thereof.

4. A composition as set forth in claim 1, wherein said reaction is performed at a temperature of 100°–350° C.

5. A composition as set forth in claim 1, further comprising an aggregate selected from glass fibers, carbon fibers and ceramics.

6. A process for the production of a heat-resisting, condensed polynuclear aromatic hydrocarbon resin, comprising the steps of:
    providing a mixture which comprises (a) a raw material containing one or more condensed polynuclear aromatic compounds having at least two condensed benzene rings, (b) a crosslinking agent containing an aromatic compound having one or more aldehyde groups directly bonded to the aromatic nuclei thereof, and (c) an acid catalyst;
    reacting said mixture at a temperature sufficient to effect the crosslinking of said one or more condensed polynuclear aromatic compounds and to form the heat-resisting, condensed polynuclear aromatic hydrocarbon resin as an infusible product.

* * * * *